United States Patent [19]
Bulanchuk

[11] 3,987,877

[45] Oct. 26, 1976

[54] TROLLEY BUSWAY HOUSING

[75] Inventor: William J. Bulanchuk, Pelham, N.Y.

[73] Assignee: Midland-Ross Corporation, Cleveland, Ohio

[22] Filed: May 2, 1975

[21] Appl. No.: 574,025

[52] U.S. Cl. .............................. 191/23 A; 16/95 R; 104/94; 104/108; 191/30; 191/35; 339/22 T
[51] Int. Cl.² ......................................... B60M 1/34
[58] Field of Search ............. 16/95 R, 96 R; 104/94, 104/108, 111; 105/155; 174/168; 191/22 R, 23 R, 23 A, 33 R, 35, 39, 40, 29 R, 30, 32; 248/307, 323; 339/20, 21 S, 22 T

[56] References Cited
UNITED STATES PATENTS

| | | | |
|---|---|---|---|
| 2,696,533 | 12/1954 | Hammerly et al. | 339/22 T X |
| 2,991,336 | 7/1961 | Shaw et al. | 191/23 A X |
| 3,334,197 | 8/1967 | Boden et al. | 191/40 |
| 3,337,697 | 8/1967 | Martin et al. | 191/23 R |
| 3,439,132 | 4/1969 | Weber | 191/35 |

*Primary Examiner*—Stephen G. Kunin
*Attorney, Agent, or Firm*—H. Duane Switzer

[57] ABSTRACT

A trolley busway housing has a generally T-shaped top portion which stiffens the housing to provide improved bending resistance and also provides a continuous top flange on which hangers can be clamped.

7 Claims, 2 Drawing Figures

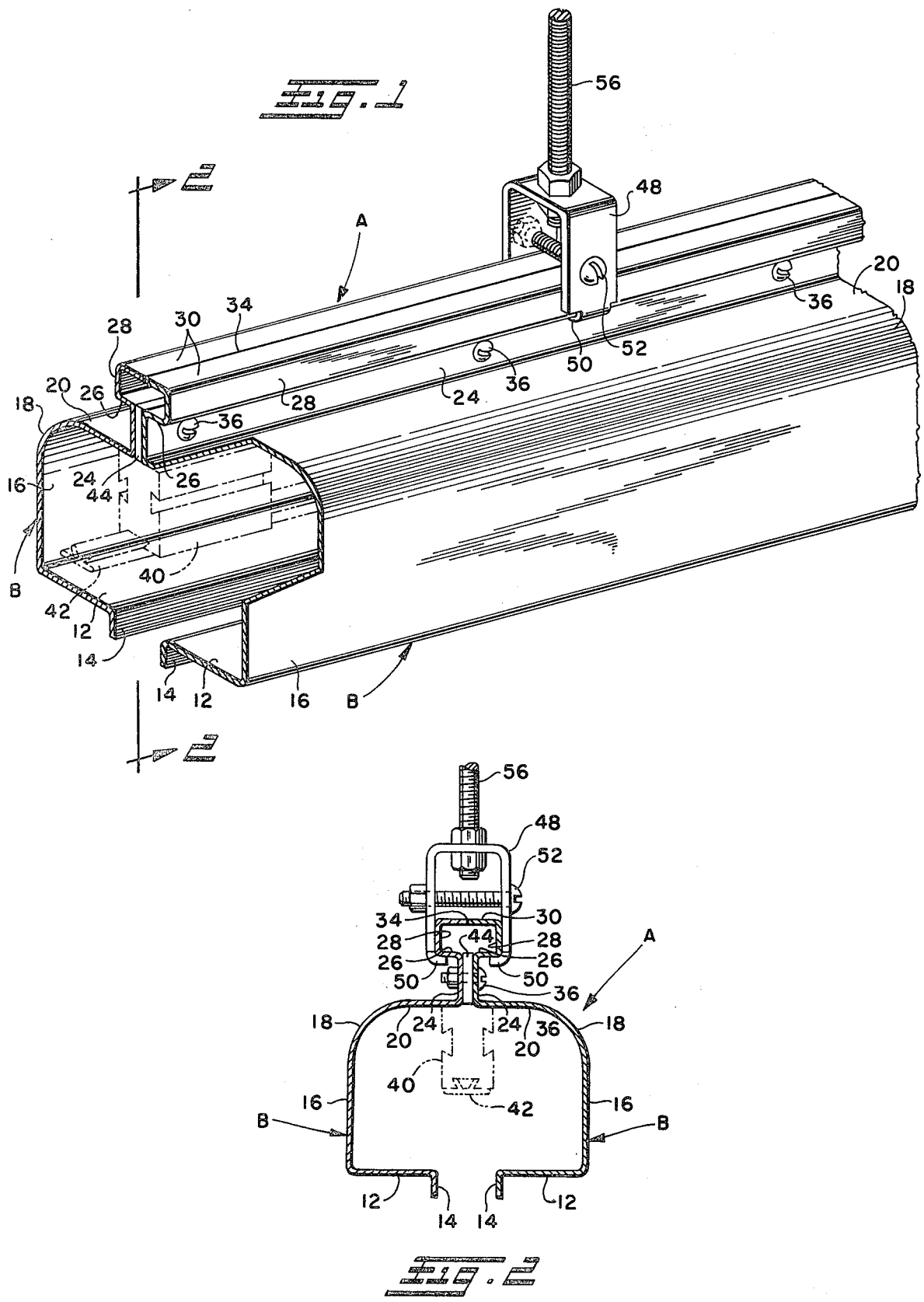

TROLLEY BUSWAY HOUSING

BACKGROUND OF THE INVENTION

This application pertains to the art of trolley busways and, more particularly, to housings for trolley busways.

One known type of metal trolley busway housing is rolled in one-piece to a desired shape and includes a top portion having a cross-sectional shape generally that of an inverted equilateral trapezoid. Hangers can easily be clamped onto such top portion anywhere along the length of the housing. Bus bar supports are also secured within the top portion, and it is somewhat difficult to properly space and position such supports.

Trolley busway housings of heavier gauge metal are normally formed in two pieces because it is difficult to roll the heavier gauge metal to the desired shape in one-piece. The two piece-type of housing includes two identical housing parts which are reversely positioned and secured together. Each housing part includes vertical top walls through which fastener assemblies extend for securing the two housing parts together. The vertical walls are recessed outwardly at longitudinally-spaced intervals for receiving supports which extend downwardly into the housing for supporting the bus bars. A housing of this type can be suspended only at couplings between housing sections, or by using one of the fastener assemblies which mounts a bus bar support. Housings have been proposed with flanges extending outwardly from the vertical walls so that hangers can be attached to the flanges. Such an arrangement would leave open spaces between the bus bar supports and dirt or small objects could enter the housing through such spaces. In addition, single flanges are themselves subject to deformation under load and do not significantly stiffen the housing against bending.

SUMMARY OF THE INVENTION

A metal trolley busway housing includes a pair of identical housing parts reversely positioned and secured together. The housing has a generally T-shaped top portion formed by a generally vertical wall and a generally horizontally extending reversely bent flange portion on each housing part.

Each housing part has a cross-sectional configuration including a generally horizontal lower portion having a free end. A generally vertical outer wall extends upwardly from the other end of the horizontal portion. The outer wall is curved inwardly in overlying relationship to the lower horizontal portion to define a generally horizontal upper portion extending inwardly beyond the free end of the lower portion. A generally vertical inner wall extends upwardly from the upper portion and has a height substantially less than the outer wall. A lower flange extends outwardly from the upper end of the inner wall a distance substantially less than the distance between the outer and inner walls. The lower flange is reversely curved to define an inwardly extending upper flange overlying the lower flange in vertically-spaced relationship thereto. The two housing parts are reversely positioned and secured together.

In a preferred arrangement, the upper flanges have upper flange ends extending inwardly beyond the inner walls and are in substantially abutting engagement with one another, while the inner walls are spaced-apart from one another.

The housing parts are secured together by fastener assemblies extending through the inner vertical walls, and bus bar supports are secured between such inner walls by the same fastener assemblies. Hanger means is clamped onto the flanges of the housing for suspending such housing from a support.

Arranging the flange ends so they extend inwardly of the inner walls provides a substantially closed upper surface on the housing so that dirt or other small objects cannot enter such housing from above.

It is a principal object of the invention to provide an improved trolley busway housing.

It is a further object of the invention to provide such a housing having improved bending resistance.

It is a further object of the invention to provide such a housing which can be suspended by hangers positioned at any point along the length of the housing.

DESCRIPTION OF THE DRAWING

FIG. 1 is a perspective illustration of a trolley busway housing constructed in accordance with the present invention; and FIG. 2 is an end elevational view looking generally in the direction of arrows 2—2 of FIG. 1.

DESCRIPTION OF A PREFERRED EMBODIMENT

With reference to the drawing, trolley busway housing A is formed from a pair of identical housing parts B which are reversely positioned and secured together.

Each housing part B includes a generally horizontal lower portion 12 having generally vertical flanges 14 extending downwardly from the free ends thereof. Flanges 14 are spaced-apart from one another to define a downwardly opening longitudinal slot in housing A.

A generally vertical outer wall 16 extends upwardly from the other end of horizontal lower portion 12, and is inwardly curved as at 18 to define a generally horizontal upper portion 20 overlying horizontal lower portion 12 in vertically-spaced relationship thereto and extending inwardly beyond flange 14 on the free end of horizontal lower portion 12.

A generally vertical inner wall 24 extends upwardly from generally horizontal upper portion 20 and has a vertical height substantially less than generally vertical outer wall 16.

A lower flange 26 extends generally horizontally outwardly from the upper end of inner wall 24 a distance substantially less than the distance between inner and outer walls 24 and 16. Lower flange 26 is reversely bent or curved as at 28 to define a generally horizontal inwardly extending upper flange 30 overlying lower flange 26 in vertically-spaced relationship thereto.

Each upper flange 30 has a longitudinally extending upper flange end 34 which extends inwardly beyond generally vertical inner wall 24.

Longitudinally-spaced holes are provided through inner wall 24 for receiving fastener assemblies 36 which may be in the form of screws and bolts. A pair of housing parts B are reversely positioned and secured together by fastener assemblies 36 extending through the inner walls of the housing parts. With the parts secured together, upper flange ends 34 are in substantially abutting engagement with one another to substantially close the upper surface of housing A, while inner walls 24 are laterally spaced-apart from one another.

A support 40 of electrical insulating material has suitable grooves therein for mounting electrical bus bars, only one of which is generally indicated in shadow line at 42. Each support 40 has a tongue portion 44 which is positioned between inner walls 24 and secured in position by the same fastener assemblies 36 which secure such walls 24 together.

A hanger 48 in the form of a generally U-shaped member has inwardly extending terminal flanges 50 receivable beneath the outer edges of lower flanges 26. A screw and bolt assembly 52 passes through suitable holes in hanger member 48 above upper flanges 30, and tightening of such screw and bolt assembly causes hanger member 48 to tightly clamp against reversely curved portions 28, while flanges 50 firmly engage beneath lower flange 26. Hanger member 48 is supported on a threaded rod 56 which may be suspended from any suitable support such as a ceiling. Hanger members 48 are positionable anywhere along the length of housing A without requiring attachment only at joints, and without requiring disassembly of fastener assemblies 36. Obviously, clamping hangers of somewhat different form than that shown at 48 may be used for clamping onto the upper portion of housing A.

It will be recognized that the upper portion of housing A is generally T-shaped in cross-section, and such cross-sectional shape is formed by inner walls 24, lower flanges 26, reversely curved portions 28 and upper flanges 30 on the housing parts.

The arrangement described substantially increases the moment of inertia for housing A so it has enhanced resistance against bending and is capable of carrying higher loads. The resistance of lower flanges 26 against upward bending is very high due to the fact that terminal ends 34 of upper flanges 30 substantially abut one another.

A trolley mounted on rollers is positionable within housing A to ride along the inner surfaces of horizontal lower portions 12 and brushes on such trolley engage the bus bars. Electrical wires or fixtures extend from the trolley through the downwardly facing slot between flanges 14.

Portion 28 between lower and upper flanges 26 and 30 preferably has a substantial height in order to make it easier to roll the shape and minimize sharp bends which might cause metal fatigue and cracking. Such an arrangement also increases the resistance of housing A against bending.

It will be recognized that each elongated housing part B has opposite side surfaces which define inside and outside surfaces and form such surfaces for housing A. A pair of housing parts B are reversely positioned in cooperating relationship to form housing A by having their inside surfaces facing one another.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A trolley busway housing comprising; a pair of housing parts, each housing part having a cross-sectional configuration including a generally horizontal lower portion having a free end and another end, a generally vertical outer wall extending upwardly from said other end of said horizontal portion, said outer wall being curved inwardly in overlying relationship to said lower portion to define a generally horizontal upper portion extending inwardly beyond said free end of said lower portion, a generally vertical inner wall extending upwardly from said upper portion and having a height substantially less than said outer wall, a lower flange extending outwardly from the upper end of said inner wall a distance substantially less than the distance between said outer and inner walls, said lower flange being reversely curved by being bent back upon itself to define an inwardly extending upper flange overlying said lower flange, each said housing part having inside and outside surfaces, and said housing parts being reversely positioned in cooperating relationship with said inside surfaces facing one another to form said busway housing and being secured together.

2. The housing of claim 1 wherein said upper flanges have upper flange ends extending inwardly beyond said inner walls and are in substantially abutting engagement with one another while said inner walls are spaced-apart from one another.

3. The housing of claim 2 wherein said housing parts are secured together by fastener assemblies extending through said inner walls, and bus bar supports secured between said inner walls by said fastener assemblies.

4. The housing of claim 1 and further including hanger means clamped on said flanges for suspending said housing from a support.

5. The housing of claim 1 wherein said housing parts are secured together by fastener assemblies extending through said inner walls, and bus bar supports secured between said inner walls by said fastener assemblies.

6. A trolley busway housing formed of a pair of housing parts reversely positioned and secured together, said housing having a generally T-shaped top portion formed by a generally vertical wall and a generally horizontally extending reversely bent flange portion on each said housing part, said reversely bent flange on each said housing part including a lower flange bent back upon itself to form an upper flange having an upper flange end extending inwardly beyond said wall, said housing parts being secured together with said upper flange ends substantially abutting one another and with said walls spaced-apart from one another, each said housing part having inside and outside surfaces and said pair of housing parts being reversely positioned by having said inside surfaces facing one another.

7. The housing of claim 6 wherein said housing parts are secured together by fastener assemblies passing through said walls, and bus bar supports secured between said walls by said fastener assemblies.

* * * * *